(12) United States Patent
Kim et al.

(10) Patent No.: US 9,923,873 B2
(45) Date of Patent: *Mar. 20, 2018

(54) SYNDICATING DEVICE AND APPLICATION MANAGEMENT

(71) Applicant: MOBILE IRON, INC., Mountain View, CA (US)

(72) Inventors: Mansu Kim, San Jose, CA (US); Suresh Kumar Batchu, Milpitas, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,573

(22) Filed: Jun. 12, 2017

(65) Prior Publication Data

US 2017/0279772 A1 Sep. 28, 2017

Related U.S. Application Data

(63) Continuation of application No. 14/793,026, filed on Jul. 7, 2015, now Pat. No. 9,712,492.

(60) Provisional application No. 62/021,617, filed on Jul. 7, 2014.

(51) Int. Cl.
*G06F 9/00* (2006.01)
*H04L 29/06* (2006.01)
*H04L 12/24* (2006.01)

(52) U.S. Cl.
CPC .......... *H04L 63/0272* (2013.01); *H04L 41/28* (2013.01); *H04L 63/0853* (2013.01); *H04L 63/102* (2013.01)

(58) Field of Classification Search
CPC .................. H04L 63/0272; H04L 63/0853
USPC ............................................. 726/15
See application file for complete search history.

(56) References Cited

U.S. PATENT DOCUMENTS

| | | | | |
|---|---|---|---|---|
| 9,705,919 B1* | 7/2017 | Jacobsen | ................ | H04L 63/20 |
| 2009/0319765 A1 | 12/2009 | Fehrle | | |
| 2011/0320741 A1 | 12/2011 | Tian | | |
| 2013/0204928 A1 | 8/2013 | Yu | | |
| 2014/0156851 A1 | 6/2014 | Suami | | |
| 2015/0195760 A1* | 7/2015 | Sanz | ..................... | H04W 36/22 370/230 |

* cited by examiner

*Primary Examiner* — Mohammad W Reza
(74) *Attorney, Agent, or Firm* — Van Pelt, Yi & James LLP (57) ABSTRACT

Techniques to provide syndicated device and application management are disclosed. In various embodiments, a request associated with accessing a third party service is received, for example, at a device management server or other management system. A third party service configuration data is used to configure the managed device to access the third party service directly from the third party service.

20 Claims, 7 Drawing Sheets

SYNDICATING DEVICE AND APPLICATION MANAGEMENT

CROSS REFERENCE TO OTHER APPLICATIONS

This application is a continuation of U.S. patent application Ser. No. 14/793,026, entitled SYNDICATING DEVICE AND APPLICATION MANAGEMENT, filed Jul. 7, 2015, which claims priority to U.S. Provisional Patent Application No. 62/021,617, entitled SYNDICATING DEVICE AND APPLICATION MANAGEMENT, filed Jul. 7, 2014, both of which are incorporated herein by reference for all purposes.

BACKGROUND OF THE INVENTION

An enterprise may use device management server(s) to manage company-owned devices, employee's devices, and/or other devices. These devices may include, for example, Android devices, Apple iPads, Apple iPhones, Windows phones, etc. A device management server may, for example, monitor devices, configure devices, deploy applications (e.g., configured applications), adjust application configurations, and/or perform other operations. Enterprise administrators for enterprise services (e.g., virtual private network (VPN), Wi-Fi Access Point (Wi-Fi AP), enterprise resource planning (ERP), customer relationship management (CRM), firewall services, company directories, etc.), application service vendors, and/or other third party services may want to utilize this functionality to manage their services and/or applications on devices. Currently, third party services typically manually configure applications, which may be cumbersome and/or time consuming.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide syndication of device and/or application management for third party applications and/or systems are disclosed. In various embodiments, a third party system can populate device information to a management system (e.g., device security state, device's VPN access state, etc.), such as an enterprise mobile device management (MDM) server. In addition, a third party service can utilize a management server integrated enterprise backend service without, for example, having complex integration efforts (e.g., enterprise directory server lookup, enterprise CA for certificate service, etc.). In some cases, a third party may also push content to an app on a device that can display the content (e.g., push a company's price book to a device's app). The techniques disclosed herein may provide an alternative to the typical approach in which MDM service administrators manually manage third party applications and/or systems. Using the approaches disclosed herein, MDM service administrators may not have to synchronize manually changes on third party services. In addition, potential service outages arising from inconsistencies between the device management platform and third party services may be avoided. In various embodiments, a third party certificate authority may manage an MDM and/or device's configuration.

In various embodiments, by providing integration with third party services (e.g., Wi-Fi, VPN, Firewall, back office services, etc.) to a device management server, a third party service can directly manage configuration, applications, and/or other aspects of a device on a device management server. In some embodiments, a third party service may be notified when new devices are ready to receive third party services in a secure way. A device management server may handle authorization of third party services, actual configuration of a device, and/or other aspects of the communication between a third party service and a device.

Figure 1A:
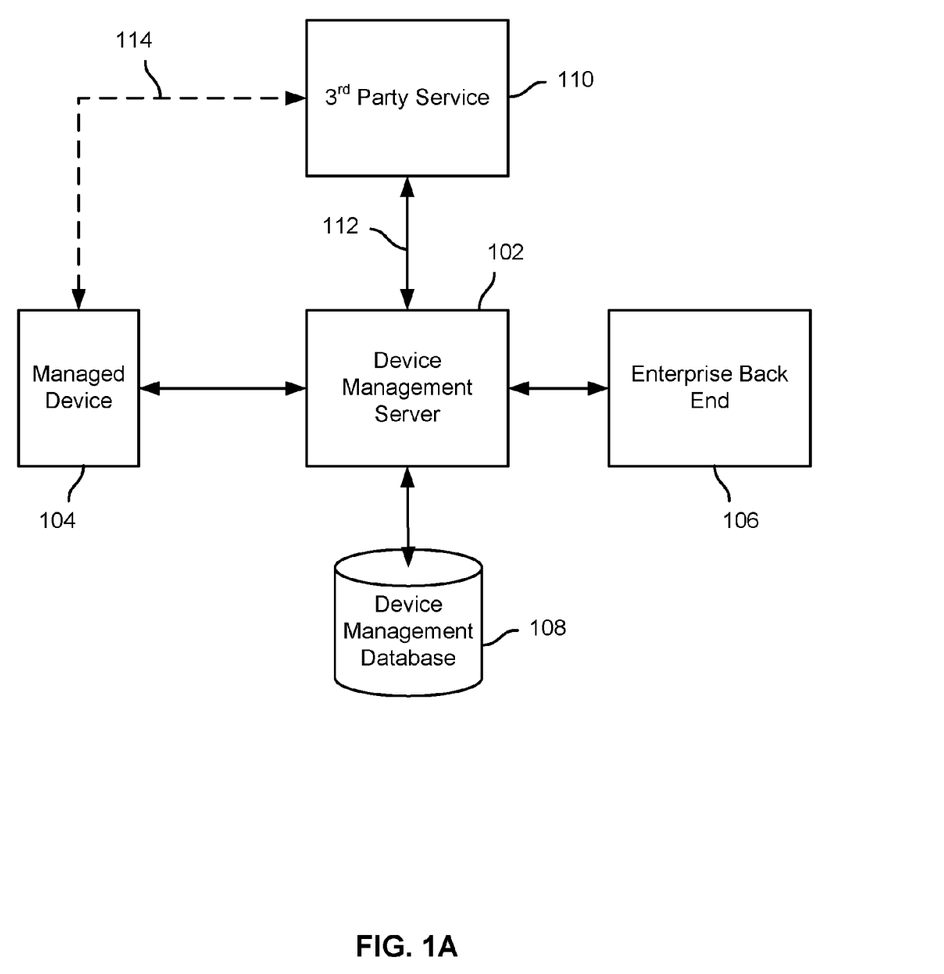
FIG. 1A is a block diagram illustrating an embodiment of a system to syndicate device and/or application management.

FIG. 1A is a block diagram illustrating an embodiment of a system to syndicate device and/or application management. In the example shown, a device management server 102, e.g., an enterprise MDM server, provides management functionality with respect to a plurality of devices 104, e.g., mobile devices such as smart phones, tablets, laptops, smart watches and other apparel, etc. In the example shown, device management server 102 provides to devices 104 secure access to enterprise back end applications and services 106. For example, a user of a device 104 may log in at device 104 using a management agent (e.g., native MDM agent configured by device management server 102, enterprise MDM agent/client installed on device 104, etc.). Device management server 102 uses configuration, device profile, user profile, and policy information in a device management database 108 to manage devices 104 and provide secure access to enterprise back end applications and services 106.

In various embodiments, a management agent on each managed device 104 is configured to be managed by device management server 102, and device management server 102 is configured to manage each managed device 104 in accordance with applicable policies stored in device management database 108.

Techniques to provide syndication of device and/or application management functionality are disclosed. In the example shown, the infrastructure and trust relationships set up by the enterprise to manage devices 104 using device management server 102 and device management database 108 are extended via syndication to allow third party applications, services, and/or systems to use the same management infrastructure to configure managed devices 104 with respect to configurations, applications, settings, etc. associated with such third party applications, services, and/or systems. In the example shown in FIG. 1A, a third party service 110, e.g., a VPN or other access service, communicates with device management server 102 via an application programming interface (API) 112 of device management server 102, specifically a management syndication API of device management server 102, to perform management functions with respect to devices 104 managed by device management server 102 within a scope associated with that third party service. For example, a VPN service may be limited to installing a VPN client app or other code and/or to modify VPN settings to values required to access the VPN service.

Once configured via communications sent by third party service 110 via API 112 and passed to managed devices 104 by device management server 102, managed devices 104 access the third part service directly via service-related data communications 114.

In various embodiments, the approaches disclosed herein establish (e.g., build) a trusted and/or secure connection between a device management server 102 and third party service(s) 110 (e.g., Wi-Fi, VPN, firewall, ERP, CRM systems, back-office services (e.g., cloud, on-premises, and/or other services)). In certain cases, third party services 110 may be authorized using approaches disclosed herein. In some embodiments, management of third party services 110 may be limited to (e.g., only to) selected devices 104 and/or user groups in a device management server 102. In various embodiments, management of third party services 110 may be limited to (e.g., only to) a group of device management functions (e.g., a group of applications, app configurations, VPN configurations, etc.). In various embodiments, a third party service 110 may be provided the ability to send messages to a device owner using, for example, a device management server's 102 messaging functionality (e.g., push notifications, text messages (e.g., SMS, MMS)), email, and/or other communications approach. In various embodiments, functionality may be provided to consolidate reporting and/or troubleshooting with third party services 110. These features may be provided by posting usage data to device management server 102. In some embodiments, a device management server 102 may maintain permissions to revoke third party service 110 access, management, and/or other privileges.

Figure 1B:
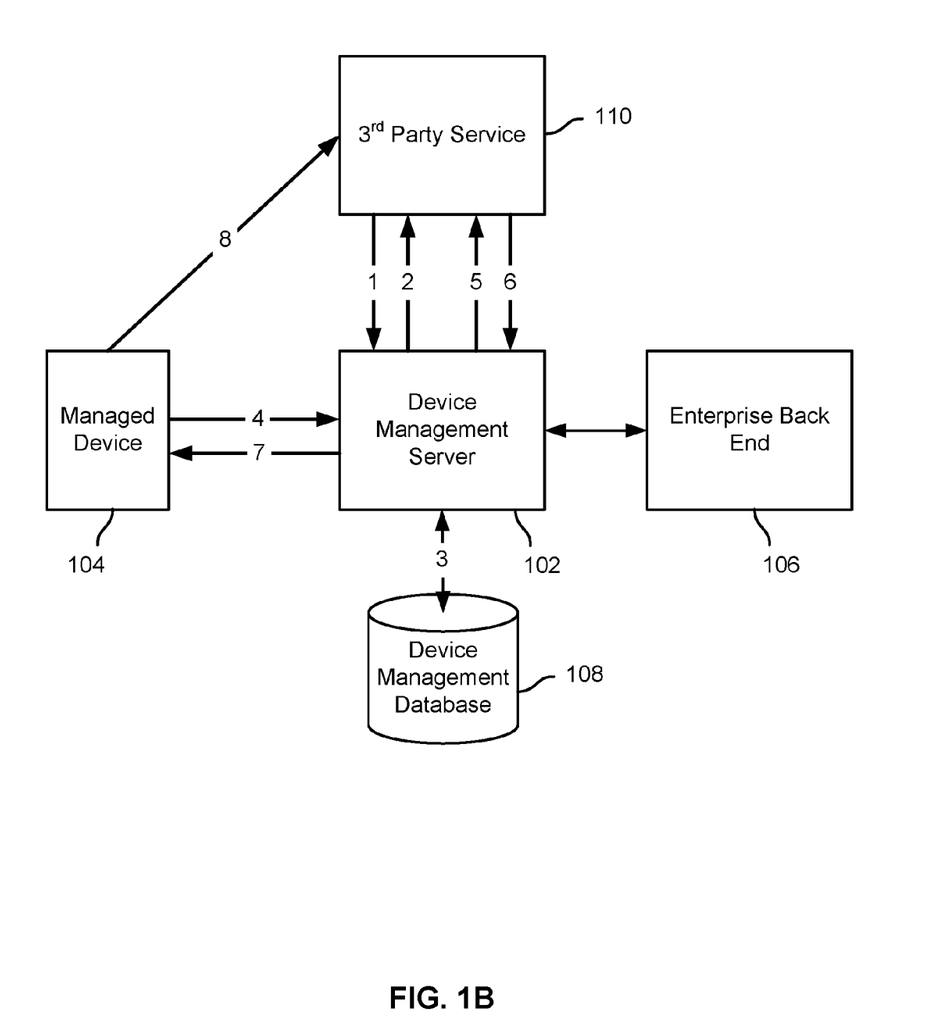
FIG. 1B is a block diagram illustrating an embodiment of a system and process to syndicate device and/or application management.

FIG. 1B is a block diagram illustrating an embodiment of a system and process to syndicate device and/or application management. In the example shown, interactions between the components shown in FIG. 1A to configure a device 104 to access a third party service 110 are represented by arrow numbered "1" to "8", to indicate the typical sequence of interactions in various embodiments. The number arrows are referenced in the discussion that follows using the numbers 1 to 8 in parenthesis, e.g., "(1)" for arrow "1".

In the example shown, a third party service 110 may register (1) (e.g., initially register) its service to a device management server 102 using, for example, an assigned integration identity (e.g., a certificate and key, application programming interface (API) user id and password, and/or authentication token). In some embodiments, during registration (1), a third party service may optionally push a plugin to device management server 102 or otherwise configure the device management server 102 to support the third party service. The plugin may, for example, provide a customized user interface (UI) for the third party services 110, may provide data storage, and/or may provide an integration interface to a third party service 110. In some embodiments, registration can happen from device management server's 102 existing UI by providing information to work with the third party service 110. In some embodiments, a device management server 102 may act as a proxy to an enterprise backend server 106. For example, a third party service 110 in some embodiments may be provided access to an enterprise LDAP or other directory server via device management server 102 associated with the third party service 110.

In various embodiments, a device management server 102 may resolve any conflict resulting from the push plugin and/or other configuration changes. For example, device management server 102 can use pre-defined priority based conflict resolution (e.g., resolve policy conflict between allow camera and disable camera policy based on priorities associated with each policy), merging a policy with more restrictive policy (e.g., passcode length policy can select most complex passcode policy), and/or otherwise resolve conflicts. In certain cases, if integration identity has permission to push configuration, a third party service 110 may directly push the configuration to the device management server 102. In some cases, an IT administrator may configure a third party service's configuration from a device management server 102. In various embodiments, if permissions allow, a third party service 110 can query an enterprise backend (e.g., directory server) 106 to configure the device management server 102.

According to some embodiments, after configuration has been applied to a group of users and/or devices 104 at the request of a third party service 110, the device management server 102 may notify (2) the third party service 110 that the group has been configured and/or may identify the configured devices 104 to the third party service 110. Third party service configuration information may be stored (3) in the device management database 108.

In various embodiments, when a device management server 102 identifies (4) (e.g., registers, initializes, etc.) a new device 104, the device management server 102 may lookup related third party services 110 (e.g., third party services associated with other devices, previously associated with the user of the new device (e.g., on other devices)). In the event dependent information (e.g., certificate, authentication token, etc.) is required, the device management server 102 may query (5) the third party service 110 and/or otherwise acquire the required information. The third party service 110 may provision and/or prepare the service for the new device 104 and may respond (6) to the device management server 102. In certain cases, the device management server 102 may generate final configuration information and push (7) configuration information, applications (e.g., associated with the third party 110), and/or other information to the device 104.

In some embodiments, configured applications and/or devices 104 may connect (8) (e.g., directly connect) to third party services 110. For example, a third party service 110 may configure a device-level VPN using the approaches disclosed herein, and the device 104 may connect to a third party VPN server 110 with configured parameters.

In some embodiments, a third party service 110 may update device information that was acquired while providing the service to the device 104 and/or app installed thereon. For example, a third party service 110 may configure a device-level VPN using the approaches disclosed herein. The device 104 may connect to a third party VPN server 110 with configured parameters. In various embodiments, a third party VPN server 110 may update the device's information (e.g., a device object) on the device management server 102, e.g., via an API call 112, with information indicating the device 104 connected via VPN and/or details of VPN status of the device 104 and/or the connection/session (e.g., identity, session started time, source IP address, etc). For a third party cloud device security service, third party server 110 may be configured to detect abnormal behavior of the device's traffic processing (e.g., accessing botnet/malware control node), and update device's security state, e.g., by calling the device management server 102 via API 112 to indicate a change in security state of device 104. In some embodiments, third party service's device information update can trigger additional device management server actions (e.g., device quarantine, notification messaging, etc.).

Figure 2:
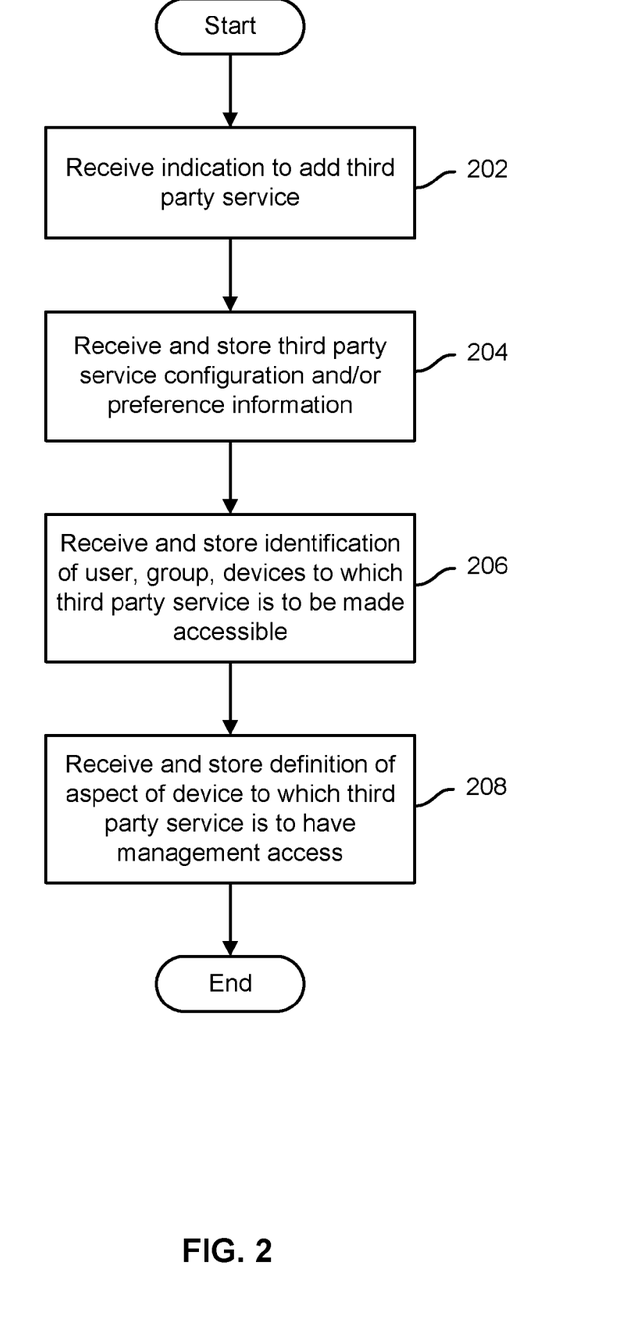
FIG. 2 is a flow chart illustrating an embodiment of a process to configure a device management server to provide syndicated access to a third party service.

FIG. 2 is a flow chart illustrating an embodiment of a process to configure a device management server to provide syndicated access to a third party service. In various embodiments, the process of FIG. 2 may be performed by and/or with respect to a device management server, such as device management server 102 of FIGS. 1A and 1B. In the example shown, an indication is received to add syndication for a new/additional third party service (202). Third party service configuration and/or preference information is received for the third party service and stored (204). For example, an administrative user interface of the device management server 102 may be used to provide the configuration. In some embodiments, a structured set of third party service configuration data, e.g., XML or other structured data, may be received. The structure may be provided in the form of a template or other form. An identification of one more users, user groups, devices, device groups, etc. over which syndicated management is to be provided to the third party service is received and stored (206). For example, devices to be subject to syndicated management by the third party service may be identified by user group (e.g., employees, engineering department, etc.). The device management server may use the user group identification and directory information from the enterprise directory service to determine which devices are to be configured via syndicated management to access the third party service. A definition of the aspect(s) of device management to be provided to the third party service via syndication is received and stored (208). For example, a third party VPN service may be delegated authority to install a VPN client app and/or to modify VPN settings, but may not be provided any ability to manage other apps or settings. In various embodiments, management requests from a third party service may be filtered and/or otherwise checked by a device management server, based on stored configuration data associated with the third party service, to determine whether a request is within a scope of authority that has been afforded to the third party service through syndication, and/or to determine whether only a filter subset of requested information, e.g., a portion related to the third party service, should be provided in response.

Figure 3:
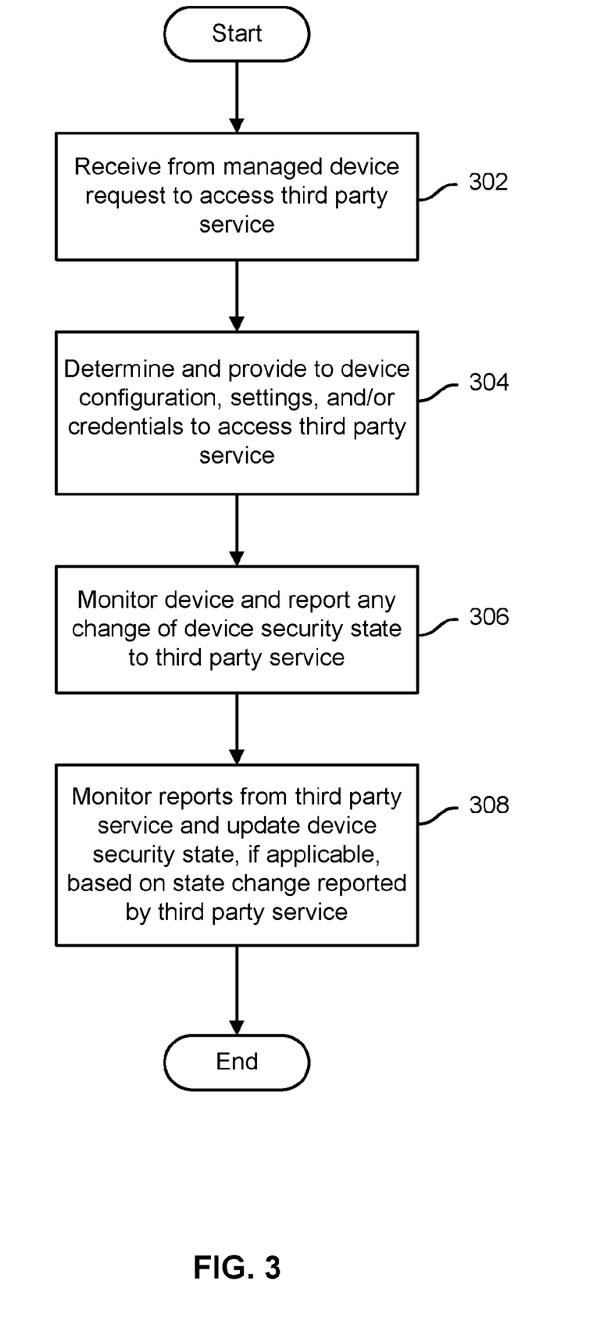
FIG. 3 is a flow chart illustrating an embodiment of a process to provide syndicated management of devices with respect to a third party service.

FIG. 3 is a flow chart illustrating an embodiment of a process to provide syndicated management of devices with respect to a third party service. In various embodiments, the process of FIG. 3 may be performed by and/or with respect to a device management server, such as device management server 102 of FIGS. 1A and 1B. In the example shown, a request is received from a managed device to access a third party service (302). For example, the request may be received at a device management server that has been configured to provide syndicated management of the requesting device with respect to the third party service. Device configuration settings, apps, credentials, etc. that may be required to access the third party service are determined and provided to the device (304). For example, the device management server may retrieve configuration requirement information from a database, and/or may query the third party service to obtain and/or validate the required information.

Once configured, the device may access the third party service directly. However, in the example shown, the device management server monitors the device for any change in state, e.g., security state, and if a state change the device management server is configured to report to the third party service is detected, the device management server reports the state change to the third party service (306).

In some embodiments, the device management server may determine that a device state has changed. For example, it may be determined that the device is jailbroken, rooted, and/or is otherwise not compliant (e.g., no longer compliant) with a requirement of the enterprise and/or the third party service. The device management server may notify the third party service of the device state change (306).

Likewise, reports from the third party service to the device management server, e.g., reflecting changes in device state detected by the third party service, are monitored (308), and if indicated the security (or other) state of the device at the device management server may be updated based at least in part on such reports from the third party service. In some embodiments, the device management server may request device status from the third party service.

In various embodiments, the third party service may notify the device management server of service changes (e.g., service revoked with respect to a device). In various embodiments, the management server may send messages (e.g., a message that the device is no longer allowed with the third party service) to the device using, for example, a push notification or other messaging channel.

Figure 4:
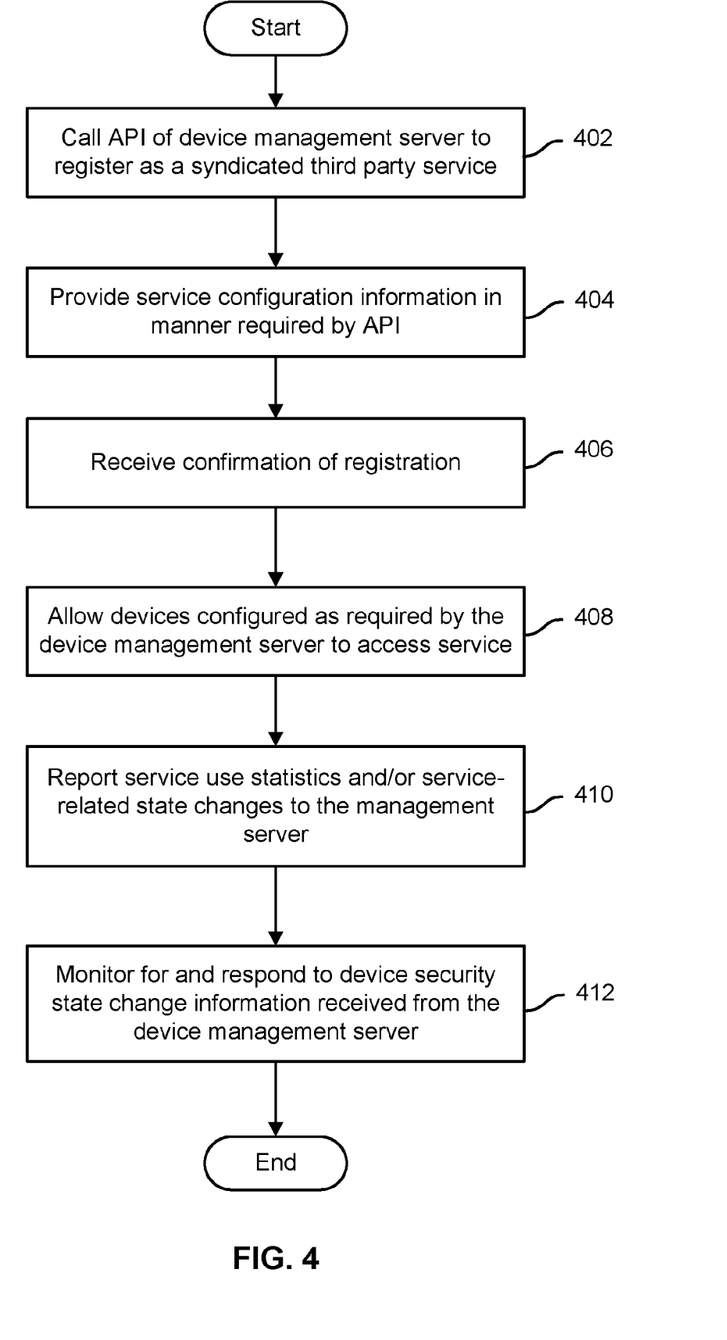
FIG. 4 is a flow chart illustrating an embodiment of a process to manage device use of a third party service via syndicated management.

FIG. 4 is a flow chart illustrating an embodiment of a process to manage device use of a third party service via syndicated management. In various embodiments, the process of FIG. 4 may be performed by a third party service, such as third party service 110 of FIGS. 1A and 1B. In the example shown, the third party service calls an API of the device management server to register as a syndicated third party service (402). In some embodiments, the API defines a way to register automatically, via the API, as a third party service. In some embodiments, registration may be subject to human review, confirmation of the validity of a certification or other credential, etc. In some embodiments, registration as a new third party service to access management function through syndication is performed via an administrative user, e.g., provided by/to the third party service and/or the device management server. Third party service configuration information is provided in a manner required by the API (404). For example, a template or other representation of data content and structure to register and configure a third party service to be provided with syndicated device and/or application may be provided, and may be populated, e.g., by an administrator of the third party service and/or via an automated process, such as querying a table, databased, configuration file, or other data set/structure at the third party service. Confirmation of registration is received (406), e.g., from the device management server. Devices under management by the device management server and which have been configured by the device management server, according the requirements provided by the third party service (404), are allowed access to the third party service (408). Service use statistics and/or other service-related and/or device state information may be reported to the device management server (410). Device security state information from the device management server may be monitored and responded to (412). For example, if the device management server indicates the device has been compromised, de-enrolled, etc., the third party service may cut off access by the device to the third party service.

In some embodiments, a third party service may provide messages, configuration changes, and/or app data to managed devices via the device management server. For example, a customer relationship management (CRM) third party service/application may from time to time push an updated price list and/or product catalog to devices associated with a sales force, via the device management server and communication channels managed by the device management server. The data sent to devices may in some embodiments be opaque to the device management server. Security may be assured by providing data that is not transparent to the device management server in a matter that ensures that only an application associated with the third party service has accessed to the file or other data.

Figure 5:
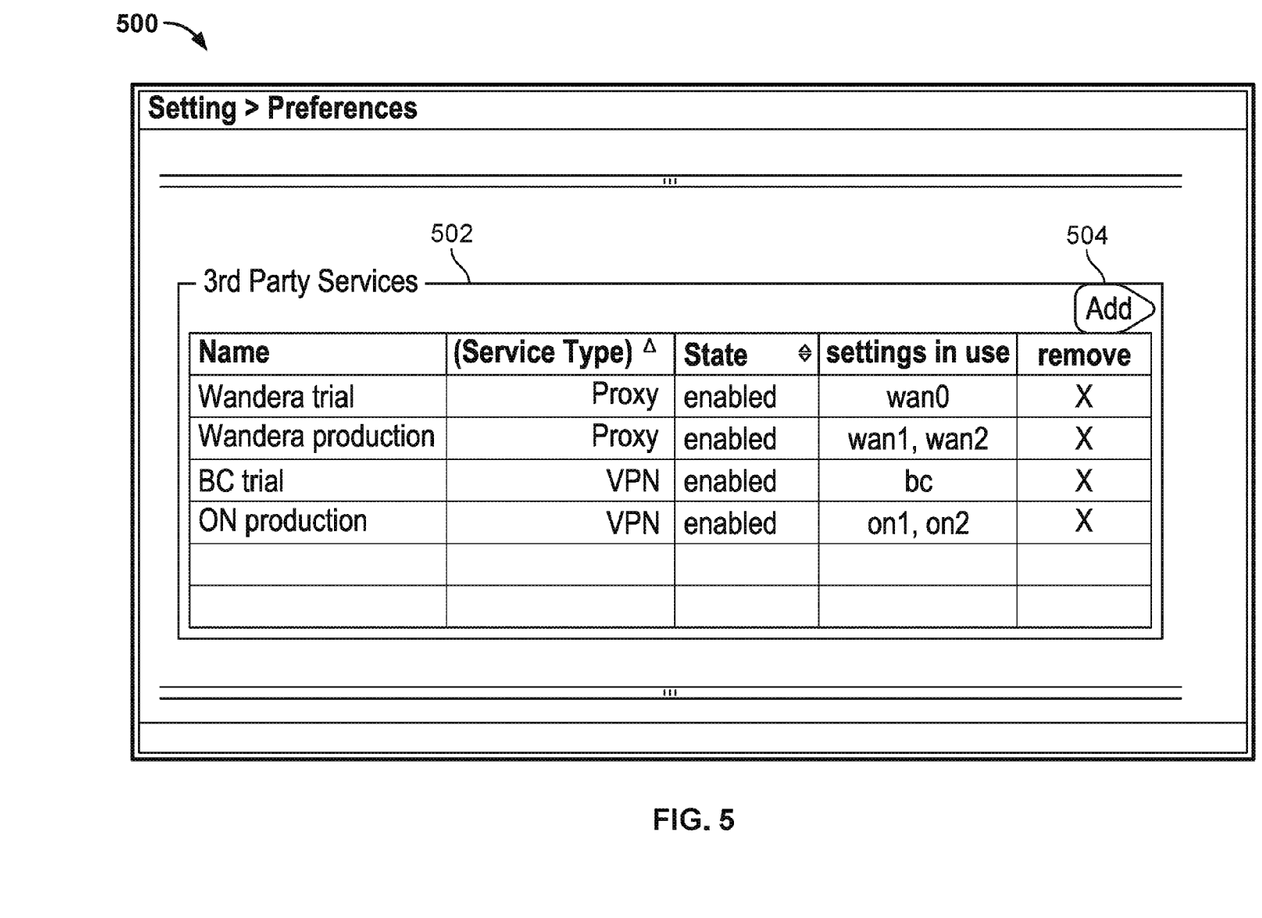
FIG. 5 is a block diagram illustrating an example administrative user interface in an embodiment of a system to syndicate device and/or application management.

FIG. 5 is a block diagram illustrating an example administrative user interface in an embodiment of a system to syndicate device and/or application management. The example interface 500 of FIG. 5 may be provided at the device management server, and/or via a web-based or other administrative interface thereof, to allow an administrator to configure, register, and/or otherwise manage third party services to which syndicated device management will be provided. In the example shown, third party service configuration interface 500 includes a third party service display area 502 in which existing third party services that have been registered to be provided with syndicated management of devices and/or applications relating to those services are listed. In the example shown, for each service the service name, service type (e.g., proxy, VPN), service state (e.g., enabled, disabled, etc.), a profile name of the settings currently in use, and an option/control to remove the service are displayed. Selection of a control 504 to "add" a new third party service results in display of an administrative user interface screen to define and configured a new third party service to participate in syndicated management of devices and/or applications, such as the user interface shown in FIG. 6.

Figure 6:
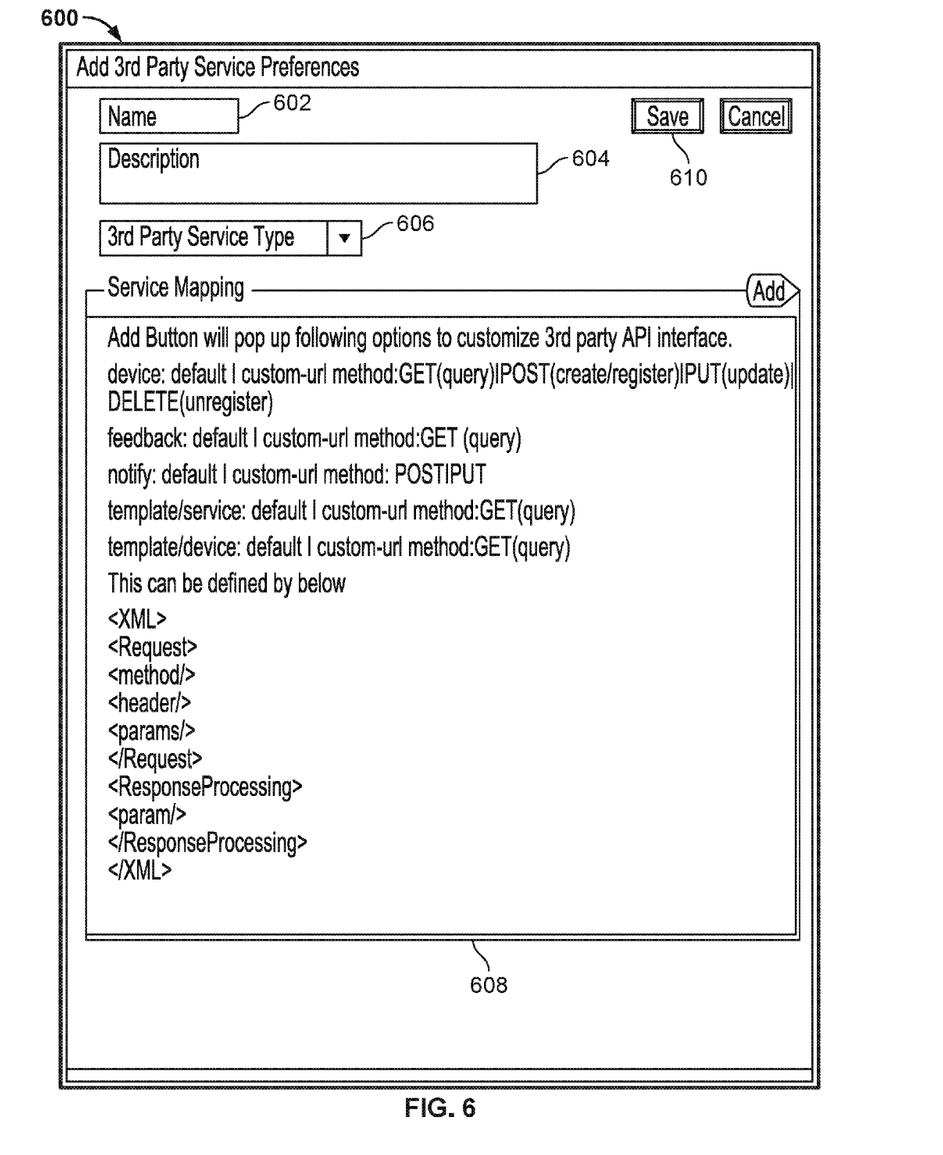
FIG. 6 is a block diagram illustrating an example administrative user interface in an embodiment of a system to syndicate device and/or application management.

FIG. 6 is a block diagram illustrating an example administrative user interface in an embodiment of a system to syndicate device and/or application management. In the example shown, "Add third party Service Preferences" interface 600 includes a name entry box 602 to enter the service name, a description text box 604 to enter a description, a pull down menu 606 to select a service type, and a service mapping entry and/or display area 608. In the example shown, instructions regarding how to use the interface 600, and in particular service mapping entry and/or display area 608, to define and configured a new third party service are provided. In this example, an XML, template is provided to define an aspect of the service. In various embodiments, different templates may be provided, e.g., depending on the type of third party service that is being added. Selection of the "save" button 610 results in the preference and/or configuration information being saved, and reflected in some embodiments in a display such as interface 500 of FIG. 5.

The example interface 600 of FIG. 6 may be provided at a device management server, allowing an administrator to configure third party service preferences and/or other settings. In various embodiments, this example interface 600 and/or a similar version thereof may be provided at the third party service (e.g., allowing a third party service administrator to configure settings/functionality of the third party service/applications on device(s)).

In various embodiments, data entered via the user interface 600 shown in FIG. 6 may be saved at the data management server. At run time, the preference/configuration data may be used to perform device management functions on behalf of the third party service. For example, a VPN or other service profile of the third party service may be downloaded to and caused by the device management server to be installed on a managed device that is to be configured to use the third party service.

In various embodiments, techniques disclosed herein may be used to extend to third party services via syndication device and/or application management functionality provided by a device management server, such as an MDM server.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
registering, at a device management server, a third party service with which syndicated management is to be provided;
receiving, at the device management server from the third party service with which syndicated management is to be provided, an identification of one or more groups associated with the third party service with which syndicated management is to be provided;

receiving a request from a managed device to access the third party service with which syndicated management is to be provided;

determining that the managed device is included in one of the one or more groups;

providing, from the device management server to the managed device, configuration data associated with the third party service, wherein the managed device is configured to access the third party service upon implementing the configuration data associated with the third party service; and receiving a request from the third party service to report a security state of the managed device; and in response to the request, reporting the security state of the managed device to the third party service, wherein the third party service is configured to provide access to the managed device based on the security state.

2. The method of claim 1, further comprising receiving an indication to add syndication for the third party service.

3. The method of claim 1, further comprising receiving third party service configuration data.

4. The method of claim 3, wherein the third party service configuration data is received via an administrative user interface.

5. The method of claim 3, wherein the third party service configuration data is received at least in part by providing a template and receiving a configuration data instance that reflects a content and structure of the template which has been populated with the third party service configuration data.

6. The method of claim 1, wherein the one or more groups includes at least one of users, user groups, devices, and/or device groups.

7. The method of claim 1, further comprising receiving a definition of one or more aspects of device management to be provided to the third party service via the syndicated management.

8. The method of claim 1, further comprising receiving from the third party service third party service configuration data to be used to configured managed devices to use the third party service.

9. The method of claim 1, wherein the third party service comprises an authorized third party service to which the device management server has been configured to provide syndicated management of managed devices and/or applications.

10. The method of claim 1, further comprising providing to the managed device, on behalf of the third party service, using a messaging functionality of the device management server, a notification or other message from the third party service.

11. The method of claim 1, further comprising providing to the managed device, on behalf of the third party service, a file or other application data from the third party service.

12. The method of claim 1, further comprising receiving from the third party service a usage data reflecting use by the managed device of the third party service.

13. The method of claim 1, further comprising receiving from the third party service a device state data associated with the managed device.

14. The method of claim 13, further comprising using the device state data to perform at the device management server a responsive action with respect to the managed device.

15. The method of claim 14, wherein the responsive action includes updating a security state of the managed device.

16. The method of claim 15, further comprising detecting a change in the security state of the managed device and reporting to the third party service data associated with the detected security state change.

17. A system, comprising:

a communication interface; and a processor coupled to the communication interface and configured to:

register a third party service with which syndicated management is to be provided;

receive from the third party service via the communication interface an identification of one or more groups associated with the third party service with which syndicated management is to be provided;

receive a request from a managed device to access the third party service with which syndicated management is to be provided;

determine that the managed device is included in one of the one or more groups;

provide configuration data associated with the third party service to the managed device, wherein the managed device is configured to access the third party service upon implementing the configuration data associated with the third party service;

receive a request from the third party service to report a security state of the managed device; and in response to the request, report the security state of the managed device to the third party service, wherein the third party service is configured to provide access to the managed device based on the security state.

18. The system of claim 17, wherein the processor is further configured to receive via the communication interface an indication to add syndication for the third party service.

19. The system of claim 17, wherein the processor is further configured to receive via the communication interface third party service configuration data.

20. A computer program product, the computer program product being embodied in a non-transitory computer readable medium and comprising computer instructions for:

registering a third party service with which syndicated management is to be provided;

receiving from the third party service an identification of one or more groups associated with the third party service with which syndicated management is to be provided;

receiving a request from a managed device to access the third party service with which syndicated management is to be provided;

determining that the managed device is included in one of the one or more groups;

providing configuration data associated with the third party service to the managed device, wherein the managed device is configured to access the third party service upon implementing the configuration data associated with the third party service;

receiving a request from the third party service to report a security state of the managed device; and in response to the request, reporting the security state of the managed device to the third party service, wherein the third party service is configured to provide access to the managed device based on the security state.

* * * * *